United States Patent [19]
Yoshikawa

[11] Patent Number: 5,841,481
[45] Date of Patent: Nov. 24, 1998

[54] METHOD TO SYNCHRONIZE ENCODING AND DECODING FREQUENCIES

[75] Inventor: Wataru Yoshikawa, Tokyo, Japan

[73] Assignee: NEC Corporation, Japan

[21] Appl. No.: 626,684

[22] Filed: Apr. 1, 1996

[51] Int. Cl.⁶ ................................................. H04N 5/04
[52] U.S. Cl. .................................. 348/500; 348/726
[58] Field of Search ........................... 348/497–500, 348/507, 513, 536, 537, 538, 540, 718, 719, 726; H04N 5/12, 5/04

[56] References Cited

U.S. PATENT DOCUMENTS

| | | | |
|---|---|---|---|
| 4,110,785 | 8/1978 | Dischert et al. | 348/507 |
| 4,402,005 | 8/1983 | Lewis, Jr. | 348/507 |
| 4,607,292 | 8/1986 | Kojima et al. | 348/537 |
| 4,633,187 | 12/1986 | Nishimura et al. | 348/507 |
| 4,670,790 | 6/1987 | Sawada et al. | 348/726 |
| 4,698,601 | 10/1987 | Aizawa | 348/537 |
| 4,841,365 | 6/1989 | Guenot et al. | 348/726 |
| 5,280,345 | 1/1994 | Uehara et al. | 348/536 |
| 5,287,182 | 2/1994 | Haskell et al. | 348/500 |
| 5,486,864 | 1/1996 | Zdepski | 348/500 |
| 5,657,089 | 8/1997 | Onagawa | 348/537 |
| 5,666,170 | 9/1997 | Stewart | 348/726 |

FOREIGN PATENT DOCUMENTS 2-274032  11/1990  Japan .

*Primary Examiner*—Richard Lee
*Attorney, Agent, or Firm*—Ostrolenk, Faber, Gerb & Soffen, LLP

[57] ABSTRACT

An encoding and decoding frequency synchronizing method capable of synchronizing the frequency on the encoder side and that on the decoder side with a small scale configuration is to be provided. A write clock generator 4 generates a write clock synchronized with input video signals. An AD converter 3 converts the input video signals into digital video signals on the basis of the write clock. A frame synchronizer 5 writes the digital signals, and reads them on the basis of a processing clock from a clock generator 6, synchronized with the transmission clock. A high efficiency encoder 7 converts the digital video signals into encoded signals on the basis of the,processing clock. A modulator 9 modulates the encoded signals on the basis of the transmission clock. A clock generator 13 generates a demodulated processing clock on the basis of the transmission clock obtained by demodulation with a demodulator 11. A high efficiency decoder 14 decodes the demodulated encoded signals with the demodulated processing clock.

6 Claims, 3 Drawing Sheets

METHOD TO SYNCHRONIZE ENCODING AND DECODING FREQUENCIES

BACKGROUND OF THE INVENTION

The present invention relates to a method to synchronize encoding and decoding frequencies, and more particularly to a method to synchronize encoding and decoding frequencies for generating, in transmitting encoded signals obtained by high efficiency encoding of video signals and decoding the encoded signals with a decoder, a reference clock synchronized with the reference clock in the encoder.

PRIOR ART

In order to receive and decode with a decoder video signals subjected to high efficiency encoding, it is necessary to decode them on the basis of a reference clock synchronized with the reference clock used for generating the encoded video signals in the encoder.

For this reason, according to the prior art, for a video signal transmission system, in which video signals on the transmitting side are digitally encoded with a digital encoder using a sampling clock prepared with reference to the horizontal synchronizing signal of the video signals, subjected to code mark inversion (CMI) encoding and transmitted and, on the receiving side, the CMI code is decoded and the encoded signals are decoded with a decoder using a sampling clock synchronized with the sampling clock on the transmitting side, there is known a frequency synchronizing method by which the CMI code rule of the CMI encoding section is violated on the transmitting side, and this violation code for CMI encoding is detected on the receiving side to prepare a sampling clock with reference to this detected code (the Gazette of the Japanese Patent Laid-open No. Hei 2(1990)-274032).

However, since this method according to the prior art transmits the information regarding the frequency of the sampling clock in the encoder as a violation code, which is low speed digital information, there are required on the transmitting side a circuit to superpose the low speed digital information on encoded data and, on the receiving side, a circuit to extract the low speed digital information, entailing the problem of bulky circuitry.

SUMMARY OF THE INVENTION

The present invention, attempted in view of the aforementioned problems, has the object of providing a method to synchronize encoding and decoding frequencies for permitting a small scale configuration to synchronize the frequency on the encoder side and that on the decoder side.

In order to achieve the foregoing object, according to the present invention, a write clock synchronized with input video signals is generated; the input video signals are converted into digital signals on the basis of the write clock; the digital signals are written into a first frame synchronizer, the digital video signals are read out of the first frame synchronizer on the basis of a processing clock synchronized with a transmission clock, and converted into encoded signals on the basis of the processing clock; the encoded signals are modulated by a modulator into a modulated wave on the basis of the transmission clock; the modulated wave is received and demodulated by a demodulator; a demodulated processing clock is generated on the basis of a transmission clock obtained by demodulation by the demodulator; and the demodulated encoded signals obtained by demodulation by the demodulator are decoded by a decoder on the basis of the demodulated clock.

Further according to the invention, digital signals decoded by the decoder are written into a second frame synchronizer on the basis of the demodulated processing clock generated in synchronism with the transmission clock demodulated by the demodulator, and the digital signals written into the second frame synchronizer are read out on the basis of a read clock of the same frequency as the write clock.

According to the invention, in the encoder, the processing clock for encoding input video signals is synchronized with the transmission clock, and the encoded signals are modulated on the basis of the transmission clock and transmitted; in the decoder, the demodulated wave is demodulated to extract the transmission clock, and the demodulated processing clock which is phase-synchronized with the extracted transmission clock is generated and used for decoding of demodulated encoded signals. Therefore, the frequency of the processing clock for encoding can be synchronized with that of the processing clock for decoding with a phase synchronizing circuit, which is a relatively simple circuit.

Further according to the invention, as the decoded digital signals written into the second frame synchronizer are read on the basis of a read clock of the same frequency as the write clock, the signals can be read with a stable read clock asynchronous with the transmission clock demodulated and extracted from the transmitted modulated wave.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

Figure 1A:
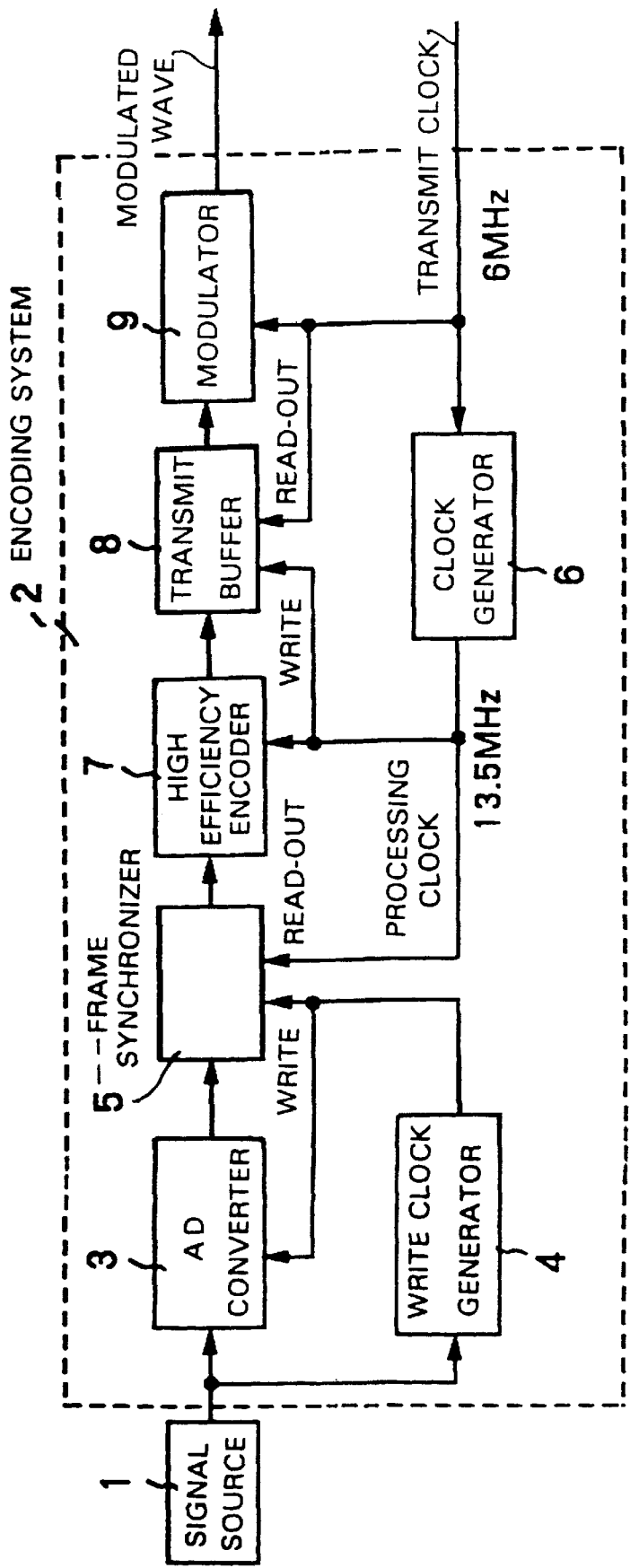
FIGS. 1A–1B is a block diagram of a preferred embodiment of the present invention.
Figure 1B:
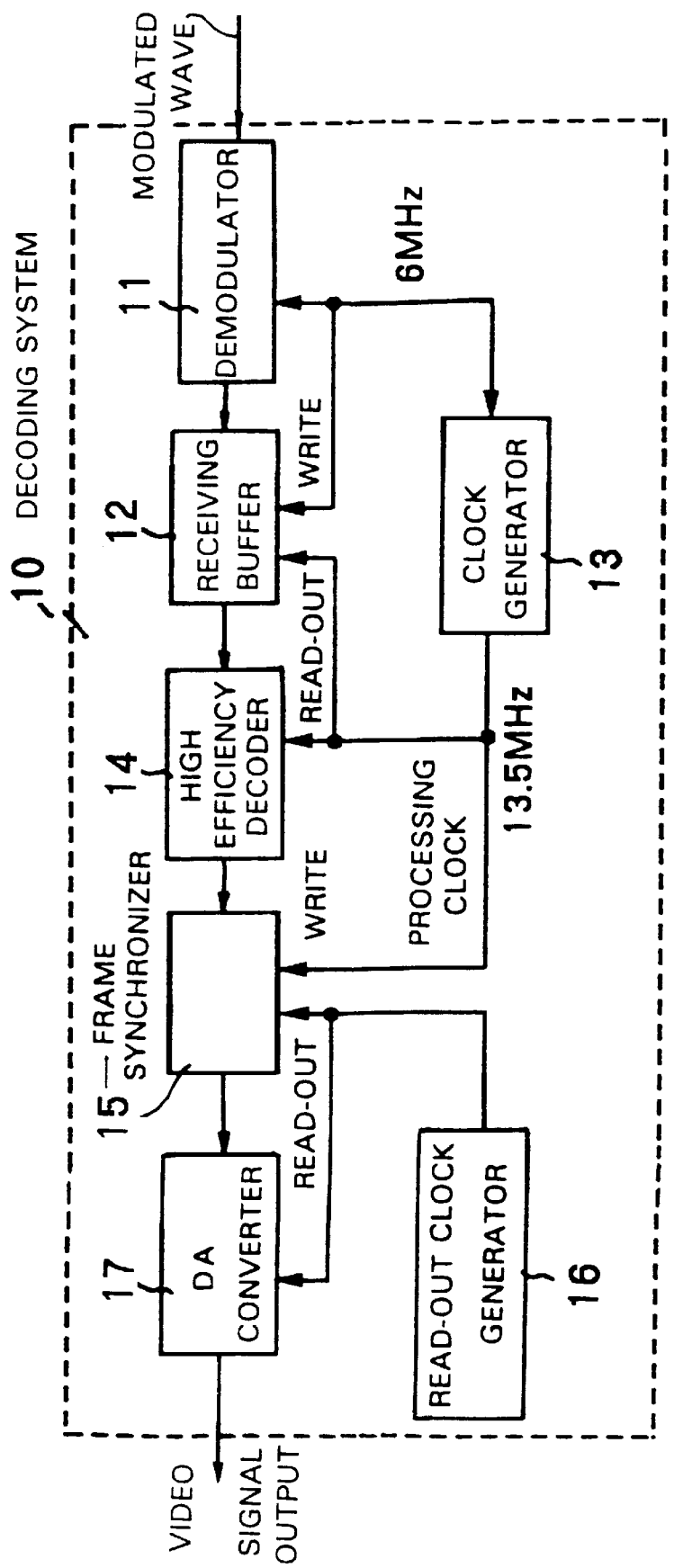

Now will be described a preferred embodiment of the present invention. FIG. 1 is a block diagram of the embodiment. Referring to FIG. 1, video signals outputted from a signal source 1 are supplied to an encoder system 2 and, after being encoded, converted into a modulated wave and transmitted. This modulated wave is received and demodulated by a decoding system 10 into the original video signals.

The encoder system 2 consists of an analog-to-digital (AD) converter 3, a write-clock generator 4, a frame synchronizer 5, a clock generator 6, a high efficiency encoder 7, a transmit buffer 8 and a modulator 9. The decoding system 10 comprises a decoder 11, a receive buffer 12, a clock generator 13, a high efficiency decoder 14, a frame synchronizer 15, a read clock generator 16 and a digital-to-analog (DA) converter 17.

Next will be described the operation of this embodiment. Video signals from the signal source 1 are supplied to the AD converter 3 and the write clock generator 4. The write clock generator 4 generates a write clock frequency synchronized with the horizontal synchronizing signal and subcarrier, among others, of the input video signals. This write clock frequency is, for instance, 13.5 MHz conforming to the CCIR 601 standard. The AD converter 3 samples the input video signals with the write clock and converts them into digital video signals, which are outputted to the frame synchronizer 5.

The clock generator 6 generates a processing clock synchronized with the transmission clock. Here it is supposed that the frequency of the process clock is 13.5 MHz, the same as that of the write clock. This clock generator 6 consists, for instance, of a phase-locked loop (PLL) circuit comprising a 1/300 frequency divider 21, a phase comparator 22, a low-pass filter (LPF) 23, a voltage-controlled oscillator (VDO) 24 and a 1/675 frequency divider 25, as illustrated in the block diagram of FIG. 2.

In this arrangement, the transmission clock of 6 MHz undergoes frequency division by the 1/300 frequency divider 21 to have a frequency of 20 kHz, and then supplied to the phase comparator 22 for phase comparison with 20 kHz from the 1/675 frequency divider 25. A phase error signal from this phase comparator 22 is fed via the LPF 23 to the VCO 24 as control voltage, and subjects its output oscillation frequency to variable control.

The output of the VCO 24, whose oscillation frequency is 13.5 MHz, is outputted externally as processing clock, and at the same time, after undergoing 1/675 frequency division by the 1/675 frequency divider 25 to have a frequency of 20 kHz, supplied to the phase comparator 22. In this manner, a processing clock of 13.5 MHz, phase-synchronized with the transmission clock of 6 MHz, is taken out of the VCO 24.

Referring to FIG. 1 again, the frame synchronizer 5, whose configuration is well known to persons skilled in the art, writes one frame or one field equivalent of digital video signals from the AD converter 3 into one of its two internal memories on the basis of the write clock of 13.5 MHz from the clock generator 4, and reads out of the other memory one frame or one field equivalent of the digital video signals written immediately before on the basis of the processing clock of 13.5 MHz from the clock generator 6. These actions are repeated alternately frame by frame or field by field (i.e. the write side memory and the read side memory are alternately switched over between each other).

Since the write clock from the write clock generator 4 and the processing clock from the clock generator 6 here are asynchronous with each other, there may arise a slight frequency difference between them, but the a synchronism between the write clock and the read clock (the processing clock) causes no trouble to encoding or the like because he frame synchronizer 5, as described above, can freely perform writing independently of the timing of the input digital video signals (asynchronous processing).

The digital video signals read by the frame synchronizer 5 in synchronism with the processing clock are supplied to the high efficiency encoder 7 to be encoded in accordance with a prescribed high efficiency encoding system. This high efficiency encoder 7 is configured so that, for example, a predicted error signal is obtained by inter-frame or intra-frame predictive processing of the input digital video signals and the output obtained by quantizing this predicted error signal, after being subjected to discrete cosine transformation (DCT), is encoded and outputted via a buffer.

The encoded signals taken out of the high efficiency encoder 7, after being written into the transmit buffer 8 on the basis of the processing clock from the clock generator 6, are read on the basis of the transmission clock of 6 MHz, demodulated by the modulator 9 in accordance with a prescribed modulation system, and converted into a modulated wave of the transmit frequency band.

Said modulated wave is supplied to the demodulator 11 in the decoding system 10 via the transmission path and demodulated into encoded signals, and at the same time the transmission clock is demodulated. The demodulated transmission clock is supplied to the clock generator 13 and, at the same time, supplied to the receive buffer 12 to cause the output demodulated encoded signals of the demodulator 11 to be written.

Figure 2:
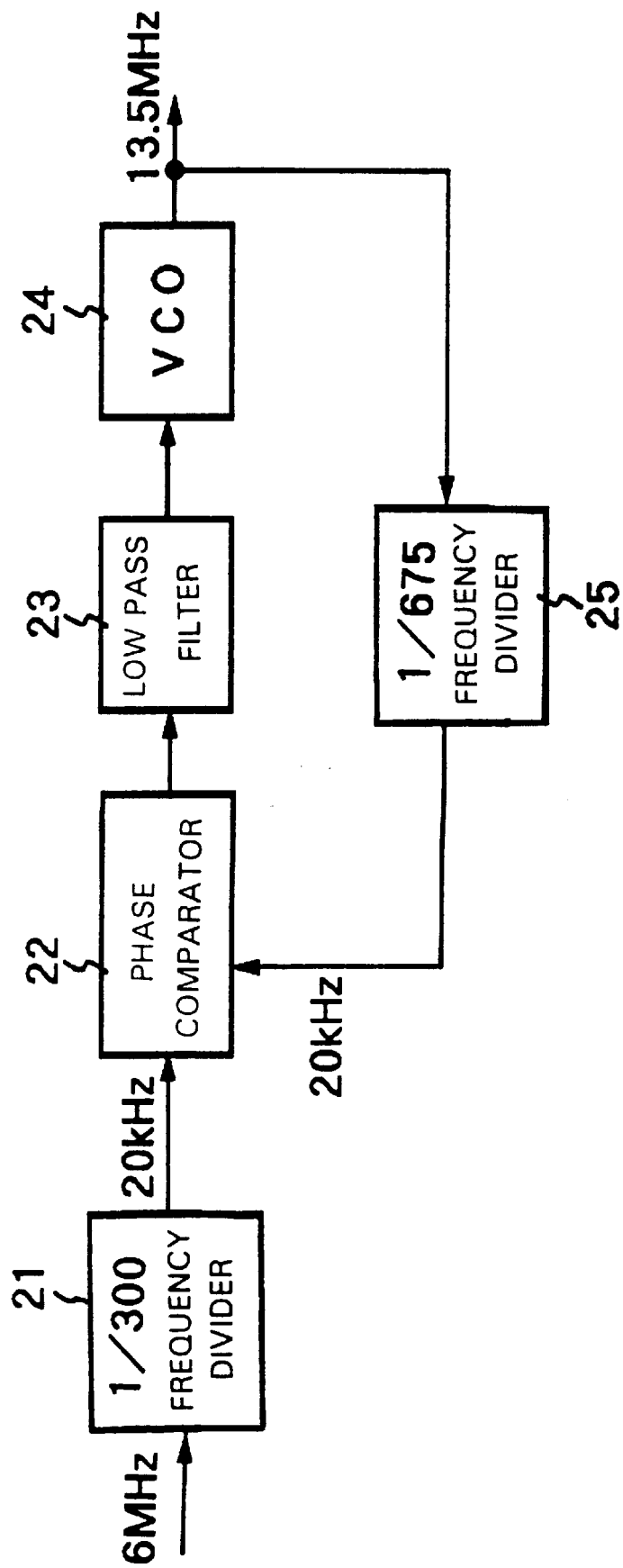
FIG. 2 is a block diagram of one example of the clock generator in FIG. 1.

The clock generator 13, like the clock generator 6, has the configuration illustrated in FIG. 2, which enables this clock generator 13 to generate a processing clock, synchronized with the input transmission clock, of the same frequency (13.5 MHz here) as the output processing clock of the clock generator 6 of the encoding system 2. The demodulated encoded signals written into the receive buffer 12 are read on the basis of the processing clock from said clock generator 13, and decoded by the high efficiency decoder 14.

The digital video signals decoded by and taken out of the high efficiency decoder 14 are supplied to the frame synchronizer 15, and written on the basis of the processing clock from the clock generator 13. The frame synchronizer 15, having the same configuration as the frame synchronizer 5, writes digital video signals on the basis of the processing clock of 13.5 MHz as the frame synchronizer 5 does, and reads on the basis of the read clock of 13.5 MHz from the read clock generator 16, which is asynchronous with the processing clock of 13.5 MHz. The DA converter 17 subjects the digital video signals from the frame synchronizer 15 to digital-to-analog conversion into the original video signals, which are then outputted.

Thus, this embodiment can synchronize the processing clock frequency of the encoder system 2 and that of the decoding system 10 with a relatively small configuration because the processing clock for video signals is synchronized with the transmission clock by relatively simple and small constituent elements including the clock generators 6 and 13 and the frame synchronizers 5 and 15.

Furthermore, since the transmission clock regenerated by the decoding system 10 in this embodiment usually includes jitter, if this clock were directly used as it is for regenerating the sampling clock, the decoded video signals would be disturbed in hue and other respects, but the arrangement to let the frame synchronizer 15 take out video signals on the basis of a stable read clock from the read clock generator 16 enables the adverse effect of jitter to be prevented.

The scope of the present invention is not limited to the above described embodiment, but it is also possible, for instance, to synchronize the read clock from the read clock generator 16 with an external image reference signal (such as black burst), and this would make it easier to synchronize video signals with peripheral systems. Nor is the applicable encoding limited to high efficiency encoding.

As hitherto described, the invention makes it possible to synchronize the frequency of the processing clock for encoding and that of the processing clock for decoding by a phase synchronizing circuit, which is a simpler circuit than what the prior art uses, by demodulating a modulated wave to extract a transmission clock, generating a demodulated processing clock which is phase-synchronized with this extracted transmission clock, and decoding modulated encoded signals with this demodulated clock.

Further according to the invention, video signals can be stably restored completely free from the influence of jitter because decoded digital signals, written into the second frame synchronizer, are read on the-basis of the read clock having the same frequency as the write clock and it is thereby made possible to read them with a stable read clock asynchronous with the transmission clock obtained by demodulating and extracting from the transmitted modulated wave.

What is claimed is:

1. A method to synchronize encoding and decoding frequencies, comprising the steps of:

generating a write clock which is synchronized with input video signals;

converting said input video signals into digital signals on the basis of said write clock;

writing said digital signals into a first frame synchronizer;

reading said digital signals out of said first frame synchronizer, on the basis of a processing clock synchronized with a transmission clock, and converting said digital signals into encoded signals on the basis of said processing clock;

modulating said encoded signals with a modulator into a modulated wave on the basis of said transmission clock;

receiving said modulated wave and demodulating said modulated wave with a demodulator to produce demodulated encoded signals;

generating a demodulated processing clock on the basis of the transmission clock obtained by demodulation with said demodulator; and decoding said demodulated encoded signals with a decoder on the basis of said demodulated processing clock.

2. A method to synchronize encoding and decoding frequencies, as claimed in claim 1, further comprising the steps of:

writing digital signals decoded by said decoder into a second frame synchronizer on the basis of said demodulated processing clock, and reading said digital signals from said second frame synchronizer on the basis of a read clock of the same frequency as said write clock.

3. An apparatus for encoding an input video signal, comprising:

a circuit operable to generate a write clock synchronized with said input video signal;

a first converting circuit operable to convert said input video signal into a digital signal on the basis of said write clock;

a writing circuit operable to write said digital signal into a frame synchronizer;

a reading circuit operable to read said digital signal out of said frame synchronizer on the basis of a processing clock synchronized with a transmission clock;

a second converting circuit operable to convert a read-out digital video signal into an encoded signal on the basis of said processing clock; and a modulating circuit operable to modulate said encoded signal into a modulated wave on the basis of said transmission clock.

4. A decoding apparatus, comprising:

a receiver circuit operable to receive a modulated wave;

a demodulator operable to demodulate said modulated wave;

a generating circuit operable to produce a demodulated processing clock on the basis of a transmission clock obtained by demodulation with said demodulator;

a decoder operable to produce a demodulated encoded signal by demodulation with said demodulator on the basis of said demodulated processing clock;

a frame synchronizer operable to receive a digital signal decoded by said decoder on the basis of said demodulated processing clock, said digital signal being read out of the frame synchronizer on the basis of a read clock of the same frequency as a write clock.

5. An encoding and decoding apparatus, comprising:

a generator circuit operable to generate a write clock synchronized with an input video signal;

a first converter operable to convert said input video signal into a digital signal on the basis of said write clock;

a first frame synchronizer operable to receive said digital signal;

a reading circuit operable to read said digital signal out of said first frame synchronizer on the basis of a processing clock synchronized with a transmission clock;

a second converter operable to convert a read-out digital video signal into an encoded signal on the basis of said processing clock;

a modulator operable to modulate said encoded signal into a modulated wave on the basis of said transmission clock;

a receiver operable to receive said modulated wave;

a demodulator operable to demodulate said modulated wave and produce demodulated encoded signals;

a generator operable to produce a demodulated processing clock on the basis of the transmission clock obtained by demodulation with said demodulator; and a decoder operable to decode said demodulated encoded signals on the basis of said demodulated processing clock.

6. An encoding and decoding apparatus as claimed in claim 5, further comprising a second frame synchronizer, a digital signal decoded by said decoder being written into said second frame synchronizer on the basis of said demodulated processing clock generated in synchronism with said transmission clock obtained by demodulation with said demodulator, said digital signal written into said second frame synchronizer being read out of said second frame synchronizer on the basis of a read clock of the same frequency as said write clock.

* * * * *